US012353898B2

(12) United States Patent
Polinger et al.

(10) Patent No.: US 12,353,898 B2
(45) Date of Patent: Jul. 8, 2025

(54) PROVIDING HOST MEDIA PROCESSING FUNCTIONALITY TO A GUEST OPERATING SYSTEM

(71) Applicant: MICROSOFT TECHNOLOGY LICENSING, LLC, Redmond, WA (US)

(72) Inventors: Anton Victor Polinger, Redmond, WA (US); Marcin Stankiewicz, Redmond, WA (US); Isuru Chamara Pathirana, New York, NY (US); Glenn Frederick Evans, Redmond, WA (US); Matthew R. Wozniak, Bellevue, WA (US); Sang Choe, Redmond, WA (US); Jitesh Krishnan, Woodinville, WA (US); Naveen Thumpudi, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 230 days.

(21) Appl. No.: 18/324,492

(22) Filed: May 26, 2023

(65) Prior Publication Data
US 2024/0394083 A1 Nov. 28, 2024

(51) Int. Cl.
*G06T 1/20* (2006.01)
*G06F 9/455* (2018.01)
(Continued)

(52) U.S. Cl.
CPC ........ *G06F 9/45545* (2013.01); *G06F 9/5016* (2013.01); *G06T 1/20* (2013.01); *H04N 9/67* (2013.01)

(58) Field of Classification Search
CPC ......... H04N 9/67; G06T 1/20; G06F 9/45545; G06F 9/5016
(Continued)

(56) References Cited

U.S. PATENT DOCUMENTS 7,581,229 B2 * 8/2009 Watkins .............. G06F 9/45537
718/1
9,626,667 B2 4/2017 Boccon-Gibod
(Continued)

FOREIGN PATENT DOCUMENTS

WO 2018119955 A1 7/2018

OTHER PUBLICATIONS

"Android Code Search", Retrieved from: https://cs.android.com/android/platform/superproject/+/master:hardware/interfaces/media/omx/1.0/vts/functional/video/VtsHalMediaOmxV1_0TargetVideoDecTest.cpp?q=VtsHalMediaOmxV1_0TargetVideoDecTest, Retrieved Date: May 13, 2022, 26 Pages.
(Continued)

*Primary Examiner* — Jacinta M Crawford
(74) *Attorney, Agent, or Firm* — Newport IP, LLC; Jacob P. Rohwer

(57) ABSTRACT

The techniques disclosed herein enable a guest operating system (OS) to access and use a color space conversion component on a host OS. The guest OS provides, via an application programming interface, a request for the host OS to generate media data in a color space format that is used by the guest OS. To generate the media data, the host OS uses a color space conversion component on the host OS, which is more performant than a corresponding color space conversion component on the guest OS because the color space conversion component on the host OS has access to hardware-accelerated functionality. Accordingly, the color space conversion component on the host OS converts media data into the color space format that is used by the guest OS, and stores the media data in memory that is accessible to the guest OS.

20 Claims, 7 Drawing Sheets

(51) Int. Cl.
*G06F 9/50* (2006.01)
*H04N 9/67* (2023.01)

(58) Field of Classification Search
USPC .......................................................... 345/501
See application file for complete search history.

(56) References Cited

U.S. PATENT DOCUMENTS

| | | |
|---|---|---|
| 10,802,861 B2 * | 10/2020 | Noorshams ......... G06F 9/45558 |
| 2017/0161865 A1 | 6/2017 | Baudouin et al. |
| 2018/0035126 A1 * | 2/2018 | Lee ..................... H04N 19/503 |
| 2018/0341529 A1 | 11/2018 | Kou |
| 2019/0116348 A1 | 4/2019 | Liu et al. |
| 2020/0401363 A1 | 12/2020 | Lee et al. |
| 2020/0409732 A1 | 12/2020 | Kovacevic |
| 2022/0012845 A1 | 1/2022 | Liu et al. |
| 2024/0111556 A1 | 4/2024 | Polinger |

OTHER PUBLICATIONS

"Android.media", Retrieved from: https://web.archive.org/web/20220707013217/https://developer.android.com/reference/android/media/package-summary, Jul. 7, 2022, 9 Pages.

Notice of Allowance mailed on Feb. 13, 2025, in U.S. Appl. No. 17/958,106, 9 pages.

* cited by examiner

PROVIDING HOST MEDIA PROCESSING FUNCTIONALITY TO A GUEST OPERATING SYSTEM

BACKGROUND

A computing device (e.g., a personal computer, a server in a datacenter) is a physical machine (may be referred to herein as "host" machine or "host" device) configured with "host" components. The host components can be hardware, software, firmware, or a combination thereof. More specifically, a host component can include a host operating system and a hypervisor configured to create and/or execute virtual resources, such as a virtual machine or a container. A virtual machine can include a "guest" operating system. One example of this scenario where a host operating system and a hypervisor are configured to create and/or execute a guest operating system is the WINDOWS SUBSYSTEM FOR ANDROID (WSA).

The host operating system and the guest operating system typically include their own media processing components configured to perform media processing functions. In many scenarios, some of the media processing components included in the host operating system are different from some of the corresponding media processing components included in the guest operating system. For instance, the media processing components included in the host operating system are often more performant when compared to the corresponding media processing components included in the guest operating system. This difference in performance between the media processing components included in the host operating system and the corresponding media processing components included in the guest operating system may result in a noticeable effect when the guest operating system is used in various media processing contexts (e.g., uploading video captured by the host device to a cloud service, analyzing video captured by the host device for security purposes).

SUMMARY

The disclosed techniques enable a guest operating system to access and use a media processing component on a host operating system. It can be beneficial for the guest operating system to access and use the media processing component on the host operating system if the media processing component on the host operating system is more performant than a corresponding, but different type of, media processing component on the guest operating system. Alternatively, it can be beneficial for the guest operating system to access and use the media processing component on the host operating system when the guest operating system does not have its own corresponding media processing component.

A media processing component is software, hardware, firmware, or a combination thereof, that is involved in performing an operation, or function, related to the processing of media data (e.g., a series of frames in video). One example of a media processing operation described herein is converting the media data between different color space formats, which is commonly referred to as color space conversion. More specifically, a hardware device (e.g., an image capture device) communicatively coupled to the host operating system is configured to capture raw media data in a color space format that is native to sensors of the hardware device (referred to herein as the "native" color space format) and pass the raw media data to the host operating system. The hardware device can be embedded in the host device or the hardware device can be a peripheral device that is connected to the host device via a wired connection or a wireless connection.

A color space describes a specific, measurable, and fixed range of possible colors, and optionally luminance values. A color space format includes a data organization (often referred to as layout) for individual pixels of an image (e.g., video frame), spatial up-sampling and/or down-sampling of the pixels in the image, and a meaning for individual pixels of the image (e.g., AYUV, YUY2, UYVY, IMC1, IMC2, IMC3, IMC4, YV12, NV12). In one example, the native color space format is the Bayer format. The Bayer format implements a color filter array for arranging red-green-blue (RGB) color filters on a grid of photosensors. The color filter array of the Bayer format is often used in image capture devices such as digital cameras, camcorders, and scanners to create an original, or raw, color image. The filter pattern in the Bayer format is a 2×2 array of pixels, with one red pixel, two green pixels, and one blue pixel.

Accordingly, the host operating system receives the raw media data from the hardware device and the host operating system is configured to convert the raw media data from the native color space format into a standard color space format that is typically used by the host operating system. The standard color space format is one that is commonly used by a plurality of different hardware devices communicatively coupled to the host operating system. Therefore, the use of the standard color space format is compatible with hardware-accelerated functionality related to processing the media data (e.g., a series of frames in a video) for display, for analysis, etc. The conversion from the native color space format to the standard color space format requires interpolation. In the context of video rendering, interpolation is used to reconstruct pixel values if pixel values are missing and/or if one of the color components is at a different resolution than other color components.

The standard color space format used by the host operating system can be a color space format that organizes that data for individual pixels in two planes (alternatively referred to as arrays). For example, the standard color space format can be the NV12 color space format. The NV12 color space format lies in the YUV color domain. The YUV color domain defines one luminance component (Y) for brightness, a first chrominance component (U) for the blue projection (alternatively referred to as "Cb"), and a second chrominance component (V) for the red projection (alternatively referred to as "Cr"). With regard to video rendering in the YUV color domain, a notation called the "A:B:C" notation is typically used to describe a color space format because the "A:B:C" notation captures how often the two chrominance components (U) and (V) are sampled relative to the luminance component (Y). The NV12 color space format is in a category of "4:2:0" color space formats that use eight bit data, or twelve bits per image pixel. More specifically, the two chrominance components (U) and (V) are subsampled by a factor of two in both the horizontal and vertical dimensions, when compared to the sampling of the luminance component (Y). The NV12 color space format stores the (Y) samples in a first plane of values. The NV12 color space format stores both the (U) and (V) samples in a second plane of values (e.g., in an interleaving manner) that follows the first plane of values. Stated alternatively, the NV12 color space format does not create and/or use separate planes for the (U) and (V) samples, and thus, the (U) and (V) samples are commonly referred to as being "packed" and not "planar".

Unfortunately, different types of operating systems operate in different color space formats, and thus, the guest operating system often requires media data to be in a non-standard color space format that is incompatible with the standard color space format used by the host operating system. Stated alternatively, the non-standard color space format used by the guest operating system is incompatible with the hardware-accelerated functionality of the host operating system.

The non-standard color space format can be a color space format that organizes the data for individual pixels in three planes. For example, the non-standard color space format can be the YV12 color space format. Similar to the NV12 color space format, the YV12 color space format is also in the category of "4:2:0" color space formats that use eight bit data, or twelve bits per image pixel. However, the YV12 color space format organizes stores the (Y) samples in a first plane of values, which is similar to the NV12 color space format. However, the YV12 color space format stores both the (U) and (V) samples in separate planes that follow the first plane of values. Accordingly, in contrast to the NV12 color space format, the (U) and (V) samples are planar and not packed in the YV12 color space format.

Based on the differences in color space formats used, an example of which is highlighted above, the host operating system conventionally provides media data to the guest operating system in the standard color space format. The guest operating system then typically calls on its own media processing component to convert the media data from the standard color space format into the non-standard color space format that is used by the guest operating system. Unfortunately, this conventional approach can be costly from a resource perspective as the media processing component on the guest operating system is often less performant than a corresponding media processing component on the host operating system. The difference in performance results from the host operating system being able to access hardware-accelerated functionality, which is unavailable to the guest operating system.

The techniques described herein address the aforementioned performance discrepancy by enabling the host operating system to generate media data in a non-standard color space format that is used by the guest operating system using a media processing component that has access to hardware-accelerated functionality. The media processing component is software configured to identify the available hardware on a device and use the available hardware in an optimal fashion to perform color space conversions (e.g., orchestrates the hardware to execute color space conversion commands). For instance, the media processing component may be a video processor (e.g., the Extended Video Processor by MICROSOFT). In one example, the media processing component can access the hardware via the DirectX Video Acceleration (DXVA) application programming interface (API) and/or the Direct3D API. The aforementioned APIs allow certain CPU-intensive operations, such as color space conversion, to be offloaded to a graphics processing unit (GPU). A GPU is an electronic circuit designed to manipulate and alter memory to accelerate the creation of images in a frame buffer. The GPU may be configured in a graphics card.

Accordingly, the techniques described herein use an API that enables a host operating system to receive, from a guest operating system, a request to receive media data (e.g., a series of frames in video) in a non-standard color space format that is used by the guest operating system. In association with the request, the guest operating system allocates space in memory for the media data in the non-standard color space format that is used by the guest operating system, as generated by the host operating system. The memory is shared between the host operating system and the guest operating system. The guest operating system provides, via the API, reference(s) to locations of the allocated memory (e.g., memory addresses). The reference(s) to the locations of the allocated memory enable the host operating system to provide, to the guest operating system, the media data in the non-standard color space format that is used by the guest operating system. This occurs after the host operating system converts the media data into the non-standard color space format that is used by the guest operating system using its own media processing component that has access to hardware-accelerated functionality.

Consequently, the host operating system provisions access to, and use of, the media processing component on the host operating system which performs color space conversion using hardware-accelerated functionality that otherwise is unavailable to the guest operating system. The hardware-accelerated functionality is unavailable to the guest operating system because the corresponding media processing component on the guest operating system implements software-limited color space conversions which requires a large amount of bandwidth of the central processing unit (CPU) of the host device.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein enable a guest operating system to access and use a media processing component on a host operating system. It can be beneficial for the guest operating system to access and use the media processing component on the host operating system when the media processing component on the host operating system is more performant than a corresponding, but different type of, media processing component on the guest operating system. In one example, the media processing component on the guest operating system is a color space conversion component (referred to herein as the guest color space conversion component) that is different than the corresponding color space conversion component on the host operating system (referred to herein as the host color space conversion component). The guest color space conversion component is less performant because the guest color space conversion component is not able to access hardware-accelerated functionality that is accessible to the host color space conversion component (e.g., the hardware-accelerated functionality is unavailable to the guest color space conversion component).

Various examples, scenarios, and aspects that enable the techniques described herein are described below with respect to FIGS. 1-7.

Figure 1:
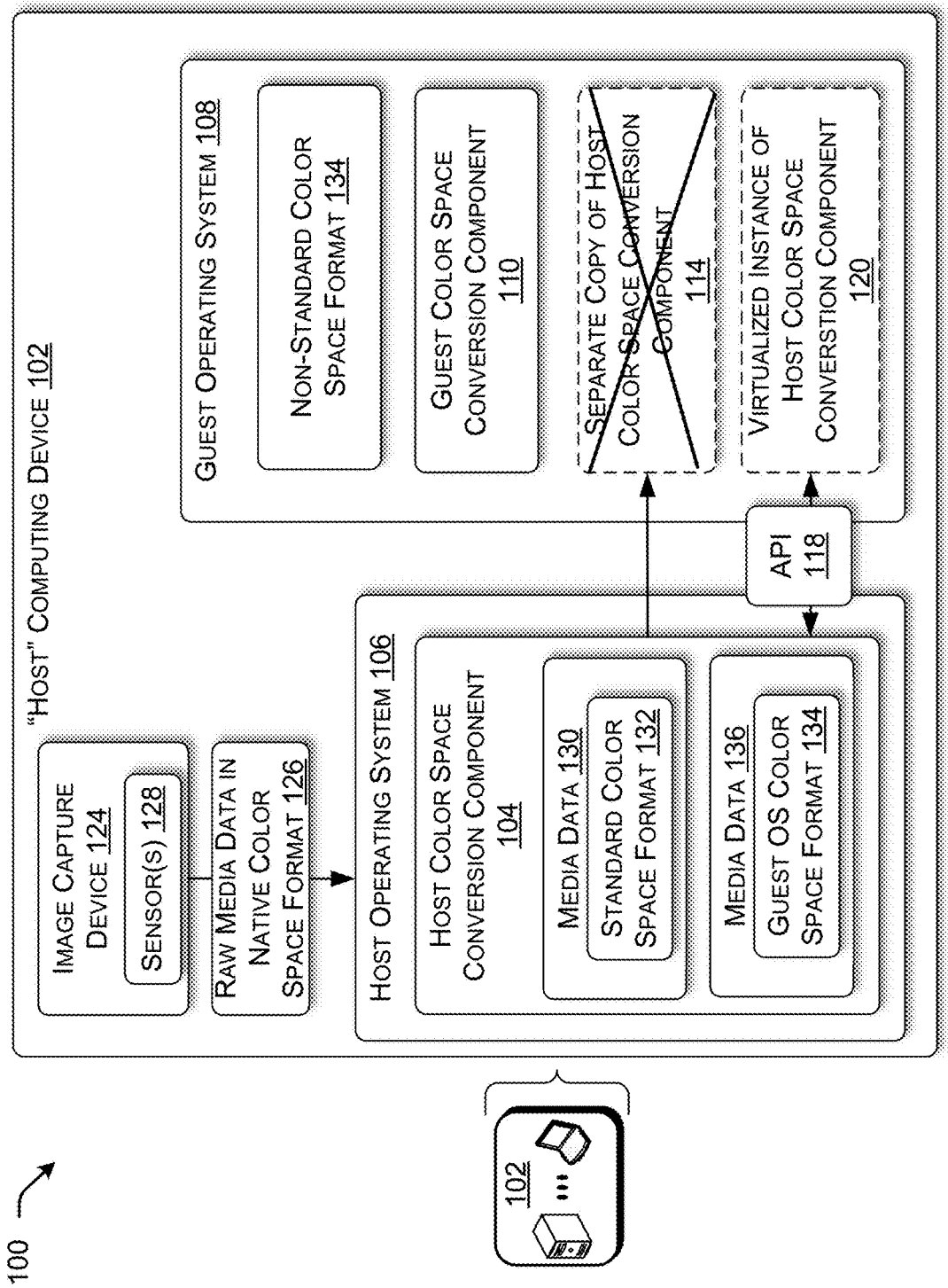
FIG. 1 illustrates an example environment where access to, and use of, a media processing component that performs color space conversion(s) on a host operating system is provisioned to a guest operating system.

FIG. 1 illustrates an example environment 100 in which a "host" computing device 102 (e.g., a desktop device, a server device, a laptop device, a tablet device, a smartphone device) provisions access to, and use of, a host color space conversion component 104 of a host operating system 106 to a guest operating system 108. As described above, the host color space conversion component 104 of the host operating system 106 is more performant compared to a corresponding, but different type of, guest color space conversion component 110 on the guest operating system 108.

One solution to address the difference in performance between the host color space conversion component 104 and the guest color space conversion component 110 is for the host operating system 106 to provision a separate copy 114 of its host color space conversion component 104 to the guest operating system 108. This would enable the guest operating system 108 to execute the host color space conversion component 104 itself. Unfortunately, provisioning the separate copy 114 of the host color space conversion component 104 to the guest operating system 108 results in some issues that are difficult to address.

First, provisioning the separate copy 114 of the host color space conversion component 104 to the guest operating system 108 increases the resource cost (e.g., central processing unit (CPU) cycles, memory footprint) due to the installation and storage requirements for the separate copy 114 of the host color space conversion component 104. Second, provisioning the separate copy 114 of the host color space conversion component 104 to the guest operating system 108 introduces code complexity issues because the high-level color conversion code in the guest operating system 108 is likely incompatible with the low-level color conversion code in the host color space conversion component 104, which is configured to interact with the hardware resources of the host computing device 102 such as a graphics processing unit (GPU). Third, provisioning the separate copy 114 of the host color space conversion component 104 to the guest operating system 108 would limit the ability for the host operating system 106 to coordinate and schedule the shared use of host hardware components for multiple guest operating systems executing via the host computing device 102. Consequently, provisioning the separate copy 114 of the host color space conversion component 104 to the guest operating system 108 is not a viable solution (hence the "X" through element 114 in FIG. 1).

Rather than provision the separate copy 114 of its host color space conversion component 104 to the guest operating system 108, the host operating system 106 is configured to provide and implement an application programming interface (API) 118 to enable execution of a virtualized instance of the host color space conversion component 120. As described herein, the API 118 includes a host proxy and a guest proxy so that it appears that the virtualized instance of the host color space conversion component 120 performs a color conversion operation via the guest operating system 108 when the color conversion operation is actually proxied to the host color space conversion component 104 of the host operating system 106 via the API 118.

Consequently, the increased amount of resource use (e.g., CPU cycles, memory footprint) to install and store a separate copy 114 of the more performant color space conversion component 104 are avoided, code complexity and compatibility issues are not introduced, and the expanded ability to coordinate and schedule hardware resource use across multiple guest operating systems is realized.

As an example, an image capture device 124 that is communicatively coupled to the host operating system 106 is configured to capture raw media data in a color space format 126 that is native to sensor(s) 128 of the image capture device 124 is shown in FIG. 1. The image capture device 124 passes the raw media data to the host operating system 106. The image capture device 124 can be embedded in the host computing device 102 or the image capture device 124 can be a peripheral device that is connected to the host computing device 102 via a wired connection or a wireless connection.

As described above, a color space format include a data organization for individual pixels of an image (e.g., video frame), spatial up-sampling and/or down-sampling of the pixels in the image, and a meaning for individual pixels of the image. In one example, the native color space format is the Bayer format.

Accordingly, the host operating system 106 receives the raw media data in the native color space format 126 from the image capture device 124 and the host operating system 106 converts the raw media data from the native color space format into media data 130 in a standard color space format 132 that is used by the host operating system 106. In one example, the standard color space format 132 is one that is commonly used by a plurality of different hardware devices communicatively coupled to the host operating system 106. Therefore, the use of the standard color space format 132 is compatible with hardware-accelerated functionality related to processing the media data 130 (e.g., a series of frames in video) for display, for analysis, etc. In some examples, the standard color space format 132 is a color space format that organizes that data for individual pixels in two planes.

The conversion from the native color space format to the standard color space format 132 requires interpolation. In the context of video rendering, interpolation is used to reconstruct pixel values if pixel values are missing (e.g., interpolating the individual RGB values in 2×2 array of pixel values) and/or if one of the color components is at a different resolution than other color components (e.g., the chrominance (U), (V) data is one fourth the resolution of the luminance (Y) data "4:2:0" color space formats for video and thus the chrominance data is upscaled four times to the same size of the luminance data to be able to compute the luminance and chrominance for an arbitrary pixel location). As described below with respect to FIG. 3, an example of the standard color space format 132 used by the host operating system 106 is the NV12 color space format, which lies in the YUV color domain.

Unfortunately, different types of operating systems use and/or operate in different color space formats, and thus, the guest operating system 108 often requires media data to be in a color space format that is different than the standard color space format 132 used by the host operating system 106. FIG. 1 shows that the gest operating system 108 uses and/or requires media data in a non-standard color space format 134. The non-standard color space format 134 can be a color space format that organizes that data for individual pixels in three planes. As described below with respect to FIG. 3, an example of the non-standard color space format 134 is the YV12 color space format, which also lies in the YUV color domain.

To address the aforementioned performance discrepancy regarding the color space conversion components 104 and 110, the API 118 allows the guest operating system 108 to issue a request to receive media data 136 in the non-standard color space format 134 that is used by the guest operating system 108. Based on the request, the host color space conversion component 104 of the host operating system 106 is configured to generate the media data 136 in the non-standard color space format 134 that is used by the guest operating system 108.

Figure 2:
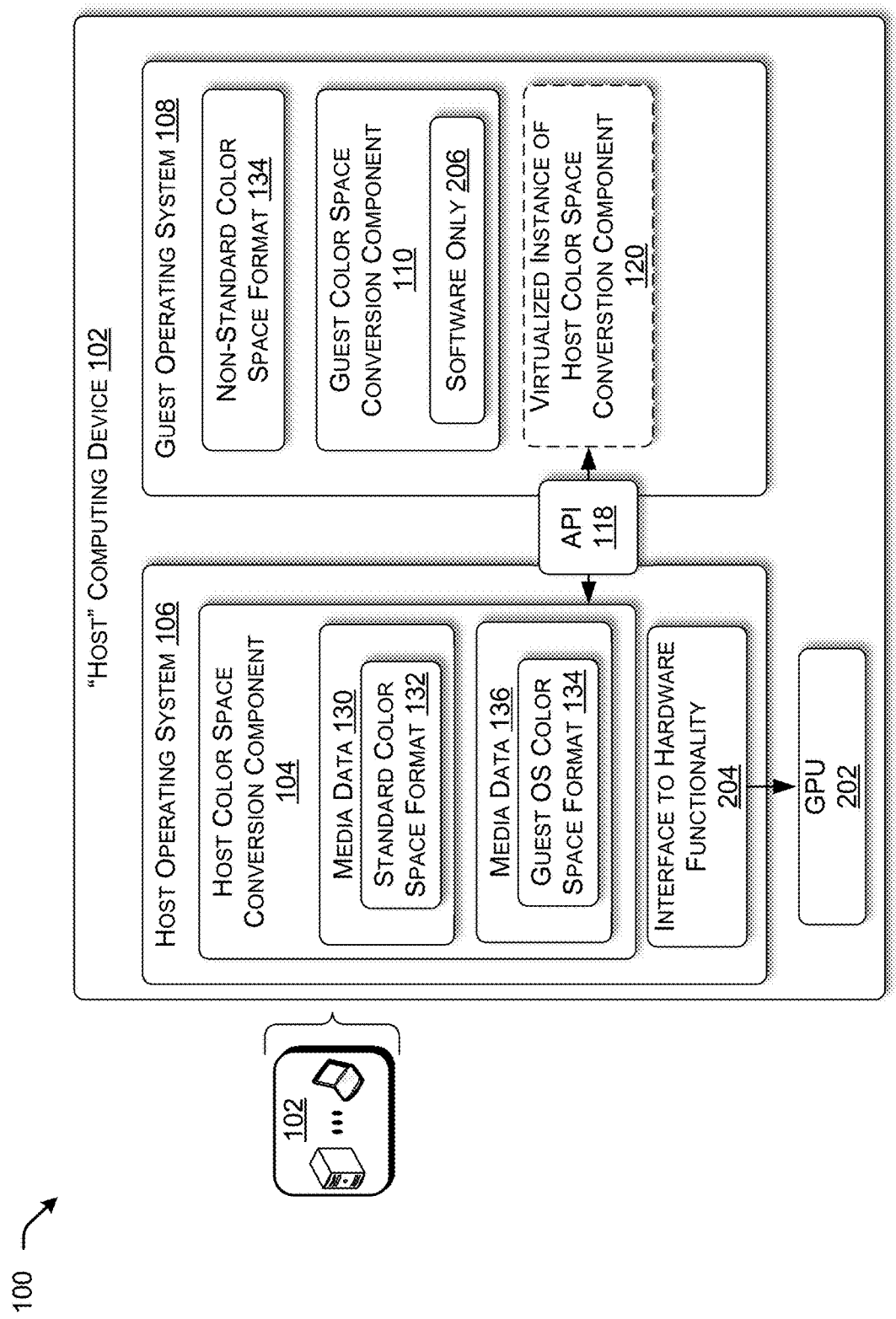
FIG. 2 illustrates the example environment of FIG. 1 where the color space conversion component on the host operating system has access to a graphics processing unit, which is inaccessible to the color space conversion component on the guest operating system.

FIG. 2 illustrates the example environment 100 of FIG. 1 where the host color space conversion component 104 on the host operating system 106 has access to a graphics processing unit (GPU) 202 via an interface to hardware functionality 204. Moreover, the interface to hardware functionality 204 and/or the GPU 202 are inaccessible to the guest color space conversion component 110 on the guest operating system 108 (e.g., the non-standard color space format 134 is incompatible with the interface to hardware functionality 204 and/or the GPU 202). As described above, the ability to access hardware-accelerated functionality, such as the GPU 202, is a reason why the host color space conversion component 104 on the host operating system 106 is more performant than the guest color space conversion component 110 on the guest operating system 108, at least because the guest color space conversion component 110 on the guest operating system 108 is configured to implement color space conversions in software only 206.

The host color space conversion component 104 is software configured to identify the available hardware (e.g., the GPU 202) on the host computing device 102 and use the available hardware in an optimal fashion to perform color space conversions (e.g., orchestrates the hardware to execute color space conversion commands). For instance, the host color space conversion component 104 may be a video processor (e.g., the Extended Video Processor by MICROSOFT). In one example, the interface to hardware functionality 204 includes the DirectX Video Acceleration (DXVA) application programming interface (API) and/or the Direct3D API. The aforementioned APIs allow certain CPU-intensive operations, such as color space conversion, to be offloaded to the GPU 202.

Figure 3:
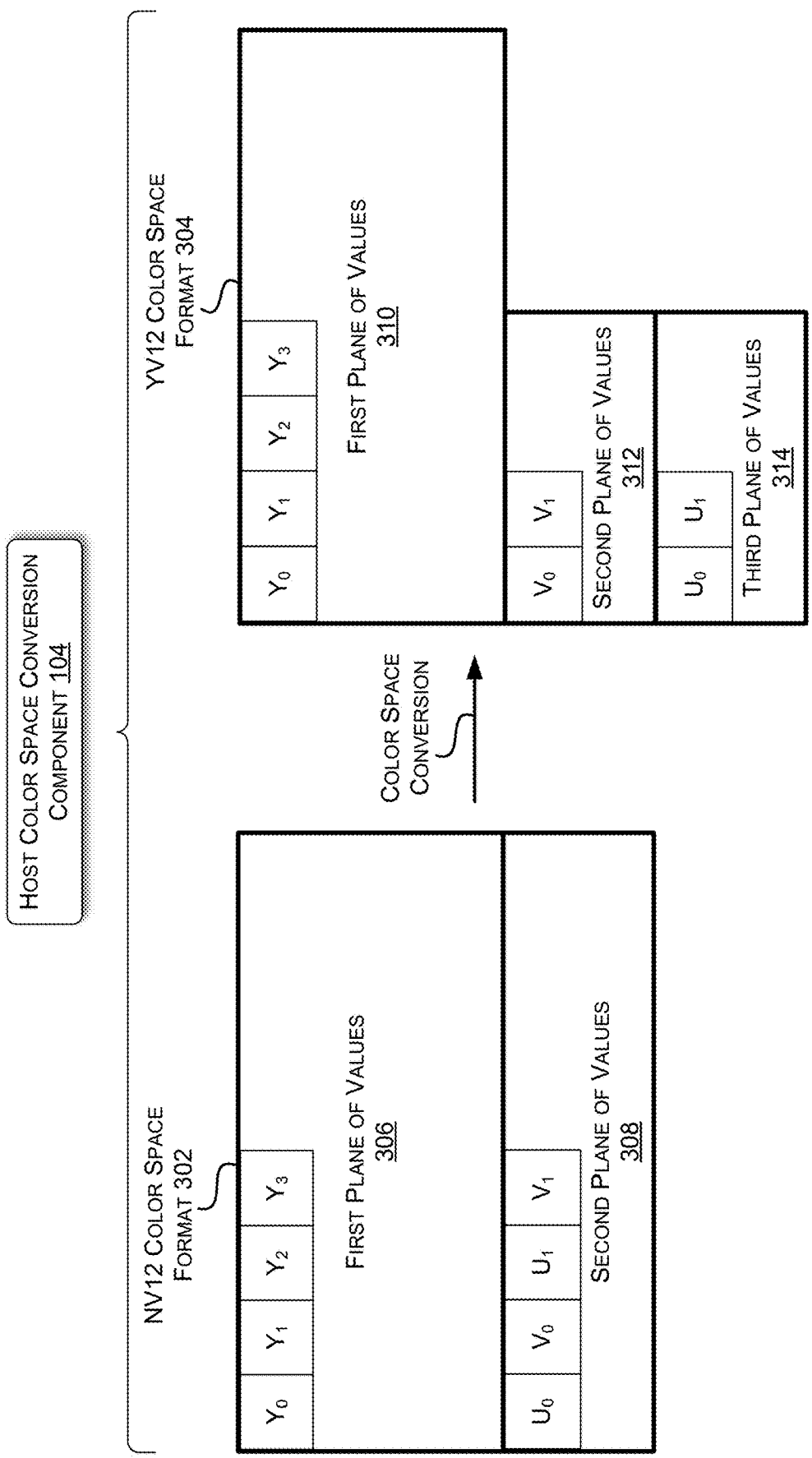
FIG. 3 illustrates an example diagram of a color space conversion from the NV12 color space format to the YV12 color space format.

FIG. 3 illustrates an example diagram of a color space conversion that can be performed by the host color space conversion component 104. In this example, the standard color space format 132 is the NV12 color space format 302 and the non-standard color space format 134 is the YV12 color space format 304. As described above, both the NV12 color space format 302 and the YV12 color space format 304 lie in the YUV color domain. The YUV color domain defines one luminance component (Y) for brightness, a first chrominance component (U) for the blue projection (alternatively referred to as "Cb"), and a second chrominance component (V) for the red projection (alternatively referred to as "Cr"). With regard to video rendering in the YUV color domain, a notation called the "A:B:C" notation is typically used to describe how often the two chrominance components (U) and (V) are sampled relative to the luminance component (Y). Both the NV12 color space format 302 and the YV12 color space format 304 are in a category of "4:2:0" color space formats that use eight bit data, or twelve bits per image pixel. More specifically, the two chrominance components (U) and (V) are subsampled by a factor of two in both the horizontal and vertical dimensions, when compared to the sampling of the luminance component (Y). However, the NV12 color space format 302 and the YV12 color space format 304 organize the sampled values in memory differently, and thus, the color space conversion operation involves moving bits to different locations in memory to achieve the desired formats.

The NV12 color space format 302 stores the (Y) samples ($Y_1, Y_2, Y_3, Y_4$, and so forth) in a first plane of values 306. The NV12 color space format 302 stores both the (U) and (V) samples in a second plane of values 308 (e.g., in an interleaving manner) that follows the first plane of values ($U_0, V_0, U_1, V_1$, and so forth). Stated alternatively, the NV12 color space format does not create and/or use separate planes for the (U) and (V) samples, and thus, the (U) and (V) samples are commonly referred to as being "packed" and not "planar". The stride, or width, of the planar surface for the second plane of values 308 is the same as the stride for the first plane of values 306 for the NV12 color space format 302. Moreover, the number of lines for the second plane of values 308 is half the number of lines for the first plane of values 306 for the NV12 color space format 302.

Similar to the NV12 color space format 302, the YV12 color space format 304 stores the (Y) samples ($Y_1, Y_2, Y_3, Y_4$, and so forth) in a first plane of values 310. However, the YV12 color space format 304 stores the (U) samples ($U_0, U_1$, and so forth) in a second plane of values 312 and stores the (V) samples ($V_0, V_1$, and so forth) in a third plane of values 314. Thus, the (U) and (V) samples are stored in separate planes. In contrast to the NV12 color space format 302, the (U) and (V) samples are planar and not packed in the YV12 color space format 304. Moreover, the stride, or width, of the planar surface for the second plane of values 312 and the third plane of values 314 is half that of the first plane of values 310 for the YV12 color space format 304. Similarly, the number of lines for the second plane of values 312 and the third plane of values 314 is half the number of lines for the first plane of values 310 for the YV12 color space format 304.

Using the example of FIG. 3, values must be read from three different locations (e.g., planes 310, 312, 314) and/or at three different speeds using the YV12 color space format 304. This requires three read channels/blocks. In contrast, values can be read from two locations (e.g., planes 306, 308) and/or at two different speeds using the NV12 color space format 302. Consequently, color space formats with two planes (e.g., NV12 color space format 302) allow for more efficient performance when reading values.

Figure 4:
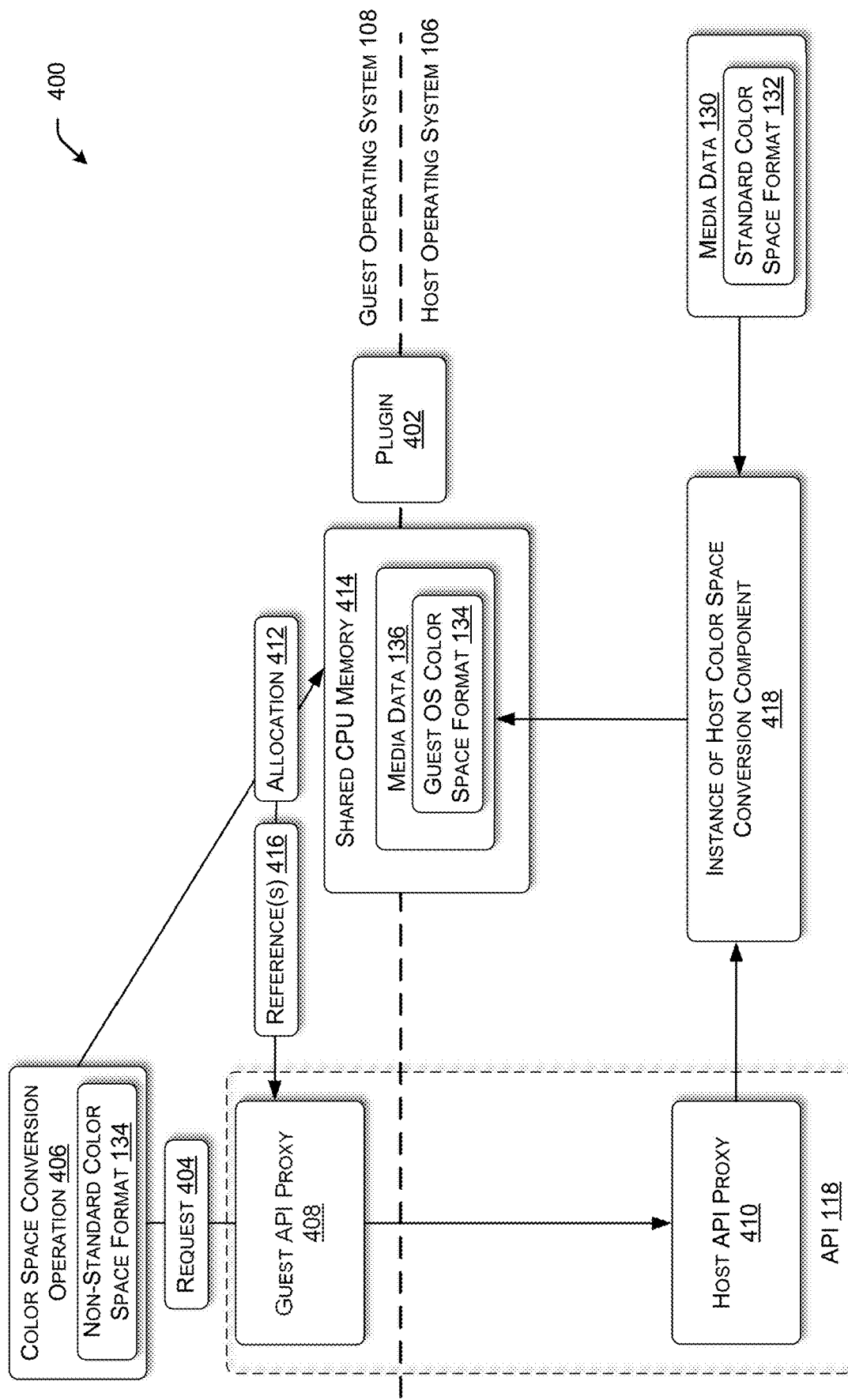
FIG. 4 illustrates a diagram that defines example components and operations that enable the host color space conversion component to be provisioned to a guest operating system in a virtualized manner.

FIG. 4 illustrates a diagram 400 that defines example components and operations that enable the host color space conversion component 104 to be provisioned to a guest operating system in a virtualized manner. The dashed line in the middle of FIG. 4 separates components configured on, and operations that occur in, the guest operating system 108, from the components configured on, and operations that occur in, the host operating system 106.

The diagram 400 in FIG. 4 may be implemented in response to the guest operating system 108 accessing and loading a plugin 402 (e.g., Open Media Acceleration (OMX) plugin) configured to instantiate the host color space conversion component 104. The plugin 402 provides abstractions for processing of media data (e.g., a series of image frames for video) using the host color space conversion component 104.

At a time after the plugin 402 is loaded, the guest operating system 108 issues or sends a request 404 for the host operating system 106 to perform a color space conversion operation 406 so the media data provided to the guest operating system 108 is in the non-standard color space format 134 used by the guest operating system 108. The request is issued and/or received via the API 118 (as illustrated in FIGS. 1 and 2). More details for the API 118 are illustrated in FIG. 4. Specifically, the API 118 includes a guest API proxy 408 (e.g., installed via the loading of the plugin 402) and a host API proxy 410. The guest API proxy 408 and the host API proxy 410 are configured to maintain the appearance that the media data 130 in the standard color space format 132 is converted to media data 136 in the non-standard color space format 134 via the guest operating system 108.

To do this, the guest operating system 108, in association with the request 404 for the color space conversion operation 406, provides an allocation 412 in shared CPU memory 414. The CPU memory 414 is referred to as "shared" CPU memory 414 because it is shared between the host operating system 106 and the guest operating system 108. Consequently, separate copies of the stored data do not need to be generated. The allocation 412 defines space in the shared CPU memory 414 for the media data 136 that has been converted to the non-standard color space format 134 by the host color space conversion component 104.

In association with the allocation 412, the guest operating system 108 provides reference(s) 416 (e.g., memory block addresses) to the host operating system 106 via the guest API proxy 408. Accordingly, the host API proxy 410 has now received the request 404 to perform the color space conversion operation 406, as well as the reference(s) 416 associated with the allocation 412 of memory space in the shared CPU memory 414 so the guest operating system 108 knows where to retrieve the media data 136 which no longer has to be converted to the non-standard color space format 134 by the guest color space conversion component 110. Consequently, based on the request 404 received via the API 118, the host operating system 106 creates an instance of its host color space conversion component 418 which has access to hardware-accelerated functionality. The instance of the host color space conversion component 418 then converts the media data 130 in the standard color space format 132 (e.g., NV12) into media data 136 in the non-standard color space format 134 (e.g., YV12) used by the guest operating system 108. The instance of the host color space conversion component 418 stores the media data 136 in the allocated space of the shared CPU memory 414 so that it can be retrieved by the guest operating system 108.

In one example, the color space conversion operations implemented by the guest operating system are configured to always be proxied to and executed via the host operating system. In another example, the guest operating system can decide whether to call on the host operating system to implement a particular color space conversion operation.

Figure 5:
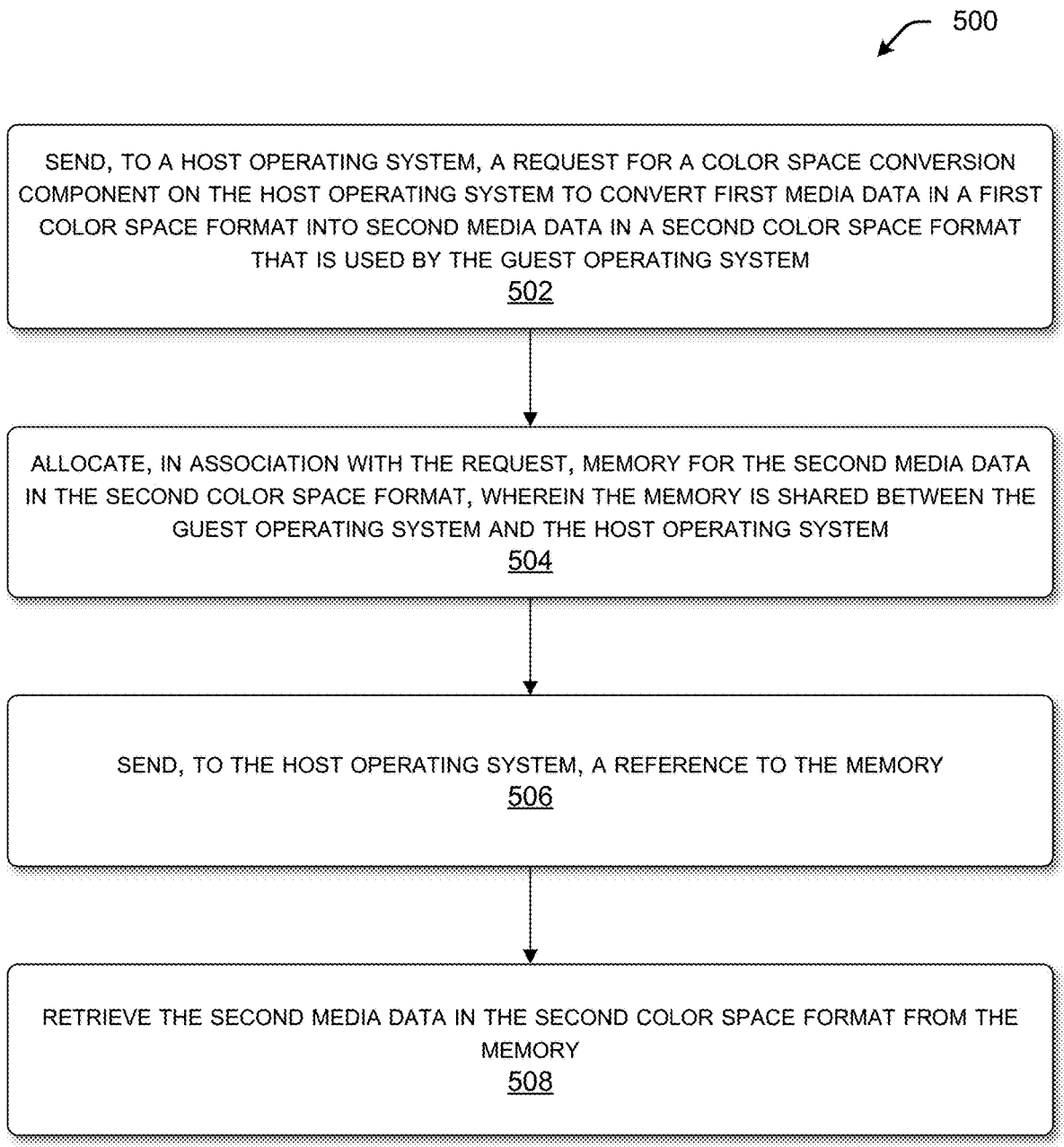
FIG. 5 is an example flow diagram showing aspects of a process implemented by the guest operating system to enable access to, and use of, a color space conversion component on a host operating system.

Turning now to FIG. 5, aspects of a method 500 implemented by the guest operating system to enable access to, and use of, a color space conversion component on a host operating system are shown and described. The method 500 beings at operation 502 where the guest operating system sends, to a host operating system, a request for a color space conversion component configured on the host operating system to convert first media data in a first color space format (e.g., the NV12 color space format) into second media data in a second color space format (e.g., the YV12 color space format) that is used by the guest operating system.

At operation 504, the guest operating system allocates, in association with the request, memory for the second media data in the second color space format. The memory is shared between the guest operating system and the host operating system.

At operation 506, the guest operating system sends, to the host operating system, a reference to the memory.

At operation 508, the guest operating system retrieves the second media data in the second color space format from the memory.

Figure 6:
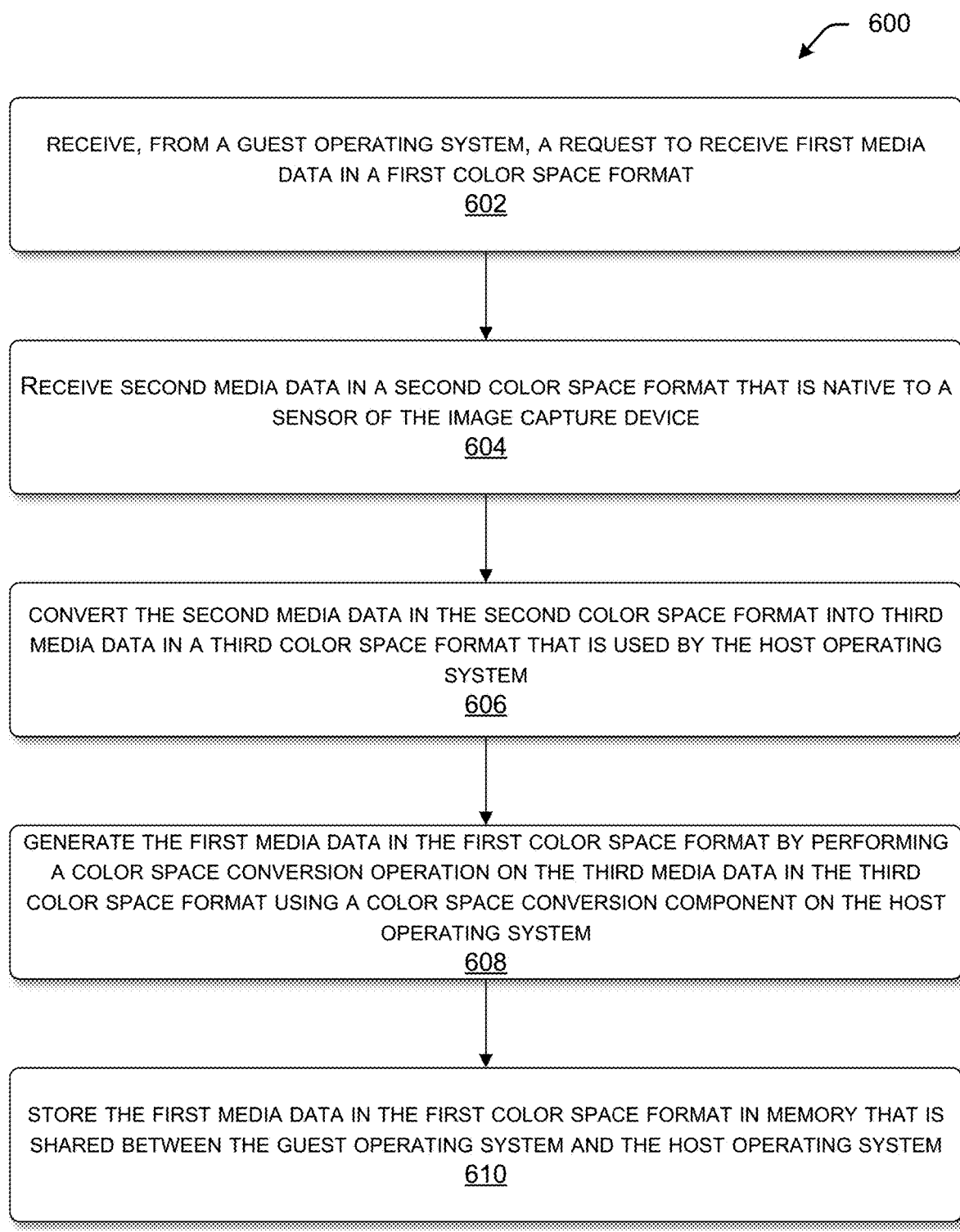
FIG. 6 is an example flow diagram showing aspects of a process implemented by the host operating system to enable access to, and use of, a color space conversion component on a host operating system for a guest operating system.

Turning now to FIG. 6, aspects of a method 600 implemented by a host operating system to enable access to, and use of, a color space conversion component on the host operating system for a guest operating system. The method begins at operation 602 where the host operating system receives, from a guest operating system, a request to receive first media data in a first color space format (e.g., the YV12 color space format).

At operation 604, the host operating system receives second media data in a second color space format (e.g., the Bayer color space format) that is native to a sensor of an image capture device.

At operation 606, the host operating system converts the second media data in the second color space format into third media data in a third color space format (e.g., the NV12 color space format) that is used by the host operating system.

At operation 608, the host operating system generates the first media data in the first color space format by performing a color space conversion operation on the third media data in the third color space format using an instance of a color space conversion component on the host operating system.

At operation 610, the host operating system stores the first media data in the first color space format in memory that is shared between the guest operating system and the host operating system.

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated processes can end at any time and need not be performed in their entirety. Some or all operations of the processes, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 7:
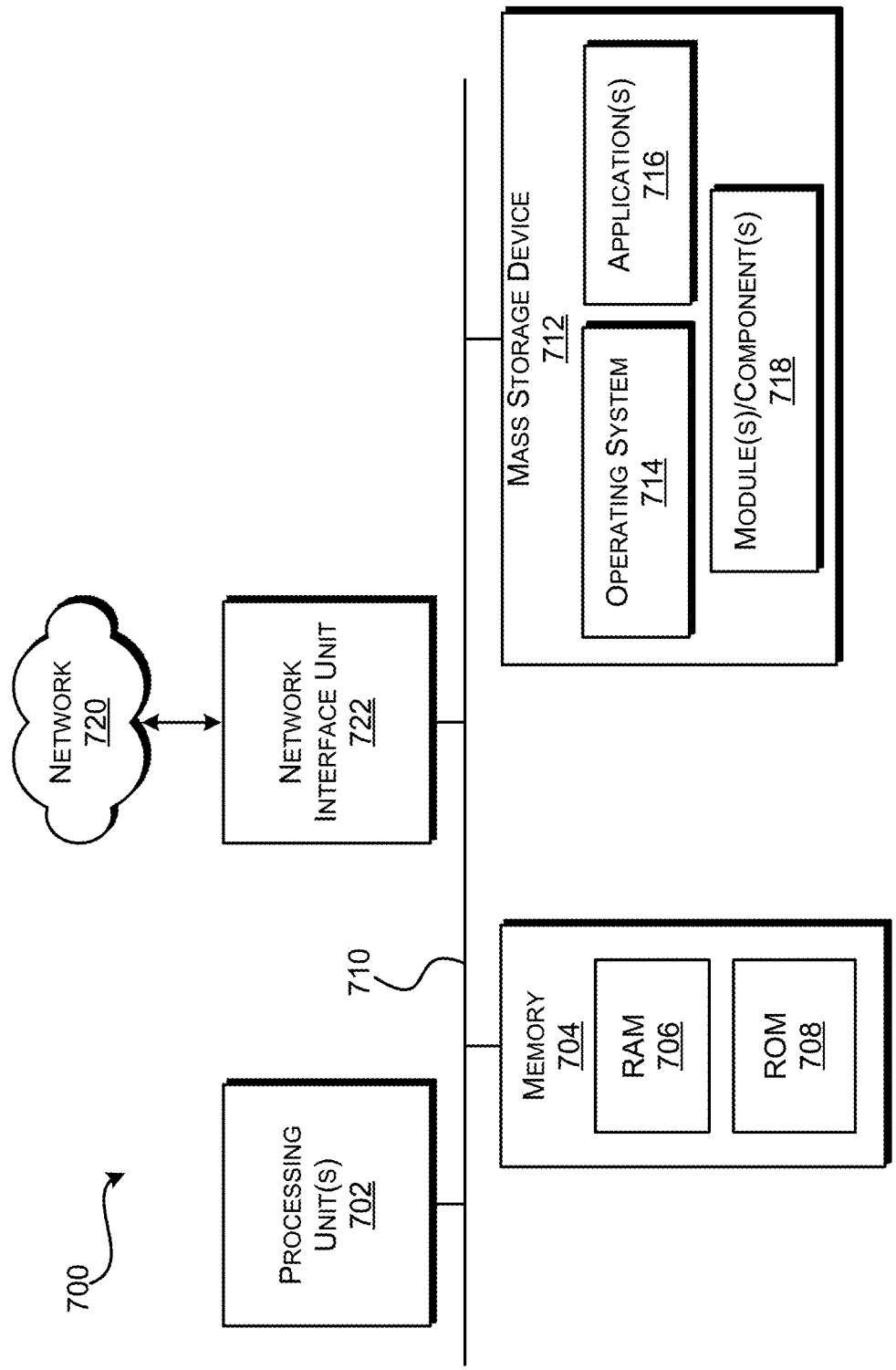
FIG. 7 is a computer architecture diagram showing an illustrative computer hardware and software architecture for a computing system capable of implementing aspects of the techniques and technologies presented herein.

FIG. 7 shows additional details of an example computer architecture 700 for a system (e.g., an individual device or a group of devices), such as computer(s) or server(s) capable of executing computer instructions (e.g., a component described herein). The computer architecture 700 illustrated in FIG. 7 includes processing system including processing unit(s) 702, a system memory 704, including a random-access memory 706 (RAM) and a read-only memory (ROM) 708, and a system bus 710 that couples the memory 704 to the processing unit(s) 702. In various examples, the processing units 702 of the processing system are distributed. Stated another way, one processing unit 702 of the processing system may be located in a first location (e.g., a rack within a datacenter) while another processing unit 702 of the processing system is located in a second location separate from the first location.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules/component(s) 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

The disclosure presented herein also encompasses the subject matter set forth in the following clauses.

Example Clause A, a method implemented by a host operating system on a computing device, the method comprising: receiving, from a guest operating system, a request to receive first media data in a first color space format; receiving second media data in a second color space format that is native to a sensor of an image capture device; converting the second media data in the second color space format into third media data in a third color space format that is used by the host operating system; generating the first media data in the first color space format by performing a color space conversion operation on the third media data in the third color space format using a color space conversion component on the host operating system; and storing the first media data in the first color space format in memory that is shared between the guest operating system and the host operating system.

Example Clause B, the method of Example Clause A, wherein the first color space format is part of a YUV color domain and the first color space format comprises a first plane of values for (Y) samples, a second plane of values for (U) samples, and a third plane of values for (V) samples.

Example Clause C, the method of Example Clause B, wherein the first color space format comprises a YV12 color space format.

Example Clause D, the method of any one of Example Clauses A through C, wherein the third color space format is part of a YUV color domain and the third color space format comprises a first plane of values for (Y) samples and a second plane of values for both (U) samples and (V) samples.

Example Clause E, the method of Example Clause D, wherein the third color space format comprises a NV12 color space format.

Example Clause F, the method of any one of Example Clauses A through E, wherein the color space conversion component implements hardware-accelerated functionality that is incompatible with the first color space format.

Example Clause G, the method of Example Clause F, further comprising accessing a graphics processing unit to implement the hardware-accelerated functionality via an application programming interface.

Example Clause H, the method of any one of Example Clauses A through G, further comprising receiving, from the guest operating system, a reference to the memory, wherein the memory is allocated by the guest operating system for the first media data in the first color space format.

Example Clause I, the method of any one of Example Clauses A through H, further comprising creating, based on the request, an instance of the color space conversion component on the host operating system.

Example Clause J, a system comprising: a processing system; and computer-readable storage media storing a host operating system that, when executed by the processing system, performs operations comprising: receiving, from a guest operating system, a request to receive first media data in a first color space format; receiving second media data in a second color space format that is native to a sensor of an image capture device; converting the second media data in the second color space format into third media data in a third color space format that is used by the host operating system; generating the first media data in the first color space format by performing a color space conversion operation on the third media data in the third color space format using a color space conversion component on the host operating system; and storing the first media data in the first color space format in memory that is shared between the guest operating system and the host operating system.

Example Clause K, the system of Example Clause J, wherein the first color space format is part of a YUV color domain and the first color space format comprises a first plane of values for (Y) samples, a second plane of values for (U) samples, and a third plane of values for (V) samples.

Example Clause L, the system of Example Clause K, wherein the first color space format comprises a YV12 color space format.

Example Clause M, the system of any one of Example Clauses J through L, wherein the third color space format is part of a YUV color domain and the third color space format comprises a first plane of values for (Y) samples and a second plane of values for both (U) samples and (V) samples.

Example Clause N, the system of Example Clause M, wherein the third color space format comprises a NV12 color space format.

Example Clause O, the system of any one of Example Clauses J through N, wherein the color space conversion component on the host operating system implements hardware-accelerated functionality that is incompatible with the first color space format.

Example Clause P, the system of Example Clause O, wherein the operations further comprise accessing a graphics processing unit to implement the hardware-accelerated functionality via an application programming interface.

Example Clause Q, the system of any one of Example Clauses J through P, wherein the operations further comprise receiving, from the guest operating system, a reference to the memory, wherein the memory is allocated by the guest operating system for the first media data in the first color space format.

Example Clause R, a method implemented by a guest operating system on a computing device, the method comprising: sending, to a host operating system, a request for a color space conversion component on the host operating system to convert first media data in a first color space format into second media data in a second color space format that is used by the guest operating system; allocating, in association with the request, memory for the second media data in the second color space format, wherein the memory is shared between the guest operating system and the host operating system; sending, to the host operating system, a reference to the memory; and retrieving the second media data in the second color space format from the memory.

Example Clause S, the method of Example Clause R, wherein: the first color space format and the second color space format are both part of a YUV color domain; the first color space format comprises a first plane of values for (Y) samples and a second plane of values for both (U) samples and (V) samples; and the second color space format comprises a first plane of values for (Y) samples, a second plane of values for (U) samples, and a third plane of values for (V) samples.

Example Clause T, the method of Example Clause R or Example Clause S, wherein the color space conversion component on the host operating system implements hardware-accelerated functionality that is unavailable to a corresponding color space conversion component on the guest operating system.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements in individual claims. Rather, any use of "first" and "second" within the Summary, Detailed Description, and/or claims may be used to distinguish between two different instances of the same element (e.g., two different color space formats)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method implemented by a host operating system on a computing device, the method comprising:
   receiving, from a guest operating system, a request to receive first media data in a first color space format;
   receiving second media data in a second color space format that is native to a sensor of an image capture device;
   converting the second media data in the second color space format into third media data in a third color space format that is used by the host operating system;
   generating the first media data in the first color space format by performing a color space conversion operation on the third media data in the third color space format using a color space conversion component on the host operating system; and
   storing the first media data in the first color space format in memory that is shared between the guest operating system and the host operating system.

2. The method of claim 1, wherein the first color space format is part of a YUV color domain and the first color space format comprises a first plane of values for (Y) samples, a second plane of values for (U) samples, and a third plane of values for (V) samples.

3. The method of claim 2, wherein the first color space format comprises a YV12 color space format.

4. The method of claim 1, wherein the third color space format is part of a YUV color domain and the third color space format comprises a first plane of values for (Y) samples and a second plane of values for both (U) samples and (V) samples.

5. The method of claim 4, wherein the third color space format comprises a NV12 color space format.

6. The method of claim 1, wherein the color space conversion component implements hardware-accelerated functionality that is incompatible with the first color space format.

7. The method of claim 6, further comprising accessing a graphics processing unit to implement the hardware-accelerated functionality via an application programming interface.

8. The method of claim 1, further comprising receiving, from the guest operating system, a reference to the memory, wherein the memory is allocated by the guest operating system for the first media data in the first color space format.

9. The method of claim 1, further comprising creating, based on the request, an instance of the color space conversion component on the host operating system.

10. A system comprising:
    a processing system; and
    computer-readable storage media storing a host operating system that, when executed by the processing system, performs operations comprising:
       receiving, from a guest operating system, a request to receive first media data in a first color space format;
       receiving second media data in a second color space format that is native to a sensor of an image capture device;
       converting the second media data in the second color space format into third media data in a third color space format that is used by the host operating system;
       generating the first media data in the first color space format by performing a color space conversion operation on the third media data in the third color space format using a color space conversion component on the host operating system; and
       storing the first media data in the first color space format in memory that is shared between the guest operating system and the host operating system.

11. The system of claim 10, wherein the first color space format is part of a YUV color domain and the first color space format comprises a first plane of values for (Y) samples, a second plane of values for (U) samples, and a third plane of values for (V) samples.

12. The system of claim 11, wherein the first color space format comprises a YV12 color space format.

13. The system of claim 10, wherein the third color space format is part of a YUV color domain and the third color space format comprises a first plane of values for (Y) samples and a second plane of values for both (U) samples and (V) samples.

14. The system of claim 13, wherein the third color space format comprises a NV12 color space format.

15. The system of claim 10, wherein the color space conversion component on the host operating system implements hardware-accelerated functionality that is incompatible with the first color space format.

16. The system of claim 15, wherein the operations further comprise accessing a graphics processing unit to implement the hardware-accelerated functionality via an application programming interface.

17. The system of claim 10, wherein the operations further comprise receiving, from the guest operating system, a reference to the memory, wherein the memory is allocated by the guest operating system for the first media data in the first color space format.

18. A method implemented by a guest operating system on a computing device, the method comprising:

sending, to a host operating system, a request for a color space conversion component on the host operating system to convert first media data in a first color space format into second media data in a second color space format that is used by the guest operating system;

allocating, in association with the request, memory for the second media data in the second color space format, wherein the memory is shared between the guest operating system and the host operating system;

sending, to the host operating system, a reference to the memory; and retrieving the second media data in the second color space format from the memory.

19. The method of claim 18, wherein:

the first color space format and the second color space format are both part of a YUV color domain;

the first color space format comprises a first plane of values for (Y) samples and a second plane of values for both (U) samples and (V) samples; and the second color space format comprises a first plane of values for (Y) samples, a second plane of values for (U) samples, and a third plane of values for (V) samples.

20. The method of claim 18, wherein the color space conversion component on the host operating system implements hardware-accelerated functionality that is unavailable to a corresponding color space conversion component on the guest operating system.

* * * * *